US 9,221,248 B2

United States Patent
Bonino

(10) Patent No.: US 9,221,248 B2
(45) Date of Patent: *Dec. 29, 2015

(54) SYSTEM FOR DETECTING INOPERATIVE INKJETS IN PRINTHEADS EJECTING CLEAR INK USING A ROTATING MEMBER HAVING A LIGHT TRANSMITTING SURFACE

(71) Applicant: Xerox Corporation, Norwalk, CT (US)

(72) Inventor: Paul S. Bonino, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/743,037

(22) Filed: Jun. 18, 2015

(65) Prior Publication Data

US 2015/0283806 A1    Oct. 8, 2015

Related U.S. Application Data

(63) Continuation of application No. 14/231,352, filed on Mar. 31, 2014, now Pat. No. 9,126,446.

(51) Int. Cl.
*B41J 29/38* (2006.01)
*B41J 29/393* (2006.01)
*B41J 2/045* (2006.01)

(52) U.S. Cl.
CPC ............ *B41J 2/0451* (2013.01); *B41J 2/04586* (2013.01)

(58) Field of Classification Search
USPC ................................................ 347/16, 19, 14
See application file for complete search history.

(56) References Cited

U.S. PATENT DOCUMENTS

| | | | |
|---|---|---|---|
| 6,227,644 B1 * | 5/2001 | Perner | 347/19 |
| 6,357,869 B1 * | 3/2002 | Rasmussen et al. | 347/102 |
| 2002/0180853 A1 * | 12/2002 | Ohsawa et al. | 347/95 |
| 2004/0012112 A1 | 1/2004 | Davidson et al. | |
| 2006/0111807 A1 | 5/2006 | Gothait et al. | |
| 2006/0141145 A1 | 6/2006 | Davidson et al. | |
| 2008/0316247 A1 * | 12/2008 | Cellura et al. | 347/19 |
| 2009/0011066 A1 | 1/2009 | Davidson et al. | |
| 2010/0151136 A1 | 6/2010 | Davidson et al. | |
| 2013/0162712 A1 * | 6/2013 | Yamanobe | 347/16 |
| 2013/0177343 A1 * | 7/2013 | Lass et al. | 400/76 |
| 2013/0328966 A1 * | 12/2013 | Gordon | 347/33 |
| 2014/0139579 A1 * | 5/2014 | Mizes et al. | 347/14 |

FOREIGN PATENT DOCUMENTS

WO    03/026876 A2    4/2003

* cited by examiner

*Primary Examiner* — Jason Uhlenhake
(74) *Attorney, Agent, or Firm* — Maginot Moore & Beck LLP

(57) ABSTRACT

An apparatus detects inoperative inkjets in a printhead. The apparatus includes a rotating member having a light transmitting surface layer onto which material is ejected by the printhead. A light source directs light into an edge of the light transmitting surface layer at a position on the circumferential perimeter of the surface layer and an optical sensor generates image data of the surface of the surface layer of the rotating member. Inoperative inkjets are detected with reference to the image data of the surface of the surface layer of the rotating member.

20 Claims, 4 Drawing Sheets

SYSTEM FOR DETECTING INOPERATIVE INKJETS IN PRINTHEADS EJECTING CLEAR INK USING A ROTATING MEMBER HAVING A LIGHT TRANSMITTING SURFACE

PRIORITY CLAIM

This application claims priority to and is a continuation application of U.S. patent application Ser. No. 14/231,352, which is entitled "System For Detecting Inoperative Inkjets In Printheads Ejecting Clear Material Using A Rotating Member Having A Light Transmitting Surface Layer," which was filed on Mar. 31, 2014, and which issued as U.S. Pat. No. 9,126,446 on Sep. 8, 2015.

TECHNICAL FIELD

The device disclosed in this document relates to printers that produce three-dimensional objects and, more particularly, to accurate detection of inoperative inkjets in such printers.

BACKGROUND

Printing of documents on substrates, such as paper, are well-known. Newer forms of printing now include digital three-dimensional manufacturing, also known as digital additive manufacturing. This type of printing is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the inkjets in the printheads that eject the drops that form the objects. During printing of an object, one or more inkjets can deteriorate by ejecting the material at an angle, rather than normal, to the printhead, ejecting drops that are smaller than an inkjet should eject, or by failing to eject any drop at all. An inkjet suffering from any of these operational deficiencies is known as an inoperative inkjet. Similar maladies in printheads are known in document printing with printheads. If the operational status of one or more inkjets deteriorates during three-dimensional object printing, the quality of the printed object cannot be assessed until the printing operation is completed. Consequently, print jobs requiring many hours or multiple days can produce objects that do not conform to specifications due to inoperative inkjets in the printheads. Once such objects are detected, the printed objects are scrapped, restorative procedures are applied to the printheads to restore inkjet functionality, and the print job is repeated. Even in document printing at high speeds on a moving web, unacceptable images may be produced over a long length of the web and this portion of the web may have to be scrapped.

Although systems have been developed in document printing systems to detect inoperative inkjets, the detection of inoperative inkjets in object printing systems is more problematic. Particularly problematic in both object printing and document printing systems are the use of the clear materials and inks. These materials and inks are difficult to detect by imaging systems because the contrast between the clear inks/materials on the substrates on which they are ejected is low. Consequently, the noise in the image data of the patterns on the substrate makes analysis of the test pattern difficult. An apparatus that enables detection of inoperative inkjets while printing with clear ink or clear materials would enable restorative procedures to be applied during object printing so printing that can produce a properly formed object or document could continue. In this manner, product yield for the printer is improved and its printing is more efficient.

SUMMARY

An apparatus that enables inoperative inkjet detection in three-dimensional printers includes a rotating member having a surface layer and an edge along a perimeter of the surface layer, a light source positioned to direct light into the edge of the surface layer of the rotating member, an optical sensor positioned to receive light emitted by the surface layer of the rotating member, the optical sensor being configured to generate image data corresponding to the surface layer of the rotating member, and a controller operatively connected to the light source and the optical sensor, the controller being configured to activate the light source selectively, to receive image data generated by the optical sensor while the light source is directing light into the edge of the rotating member, and to detect inoperable inkjets in a printhead that ejected material onto the surface layer of the rotating member with reference to the received image data and the predetermined pattern.

A printer that incorporates the apparatus for detecting inoperative inkjets includes a rotating member having a surface layer and an edge along a perimeter of the surface layer, a printhead configured to eject material onto the surface layer of the rotating member, a light source positioned to direct light into the edge of the surface layer of the rotating member, an optical sensor positioned to receive light emitted by the surface layer of the rotating member, the optical sensor being configured to generate image data corresponding to the surface layer of the rotating member, and a controller operatively connected to the printhead, the light source and the optical sensor, the controller being configured to operate the printhead to eject material onto the surface layer of the rotating member with reference to a predetermined pattern, to activate the light source selectively, to receive image data generated by the optical sensor while the light source is directing light into the edge of the rotating member, and to detect inoperable inkjets in the printhead with reference to the received image data and the predetermined pattern.

BRIEF DESCRIPTION OF THE DRAWINGS

The foregoing aspects and other features of an apparatus or printer that detects inoperative inkjets during three-dimensional printing are explained in the following description, taken in connection with the accompanying drawings.

DETAILED DESCRIPTION

Figure 1:
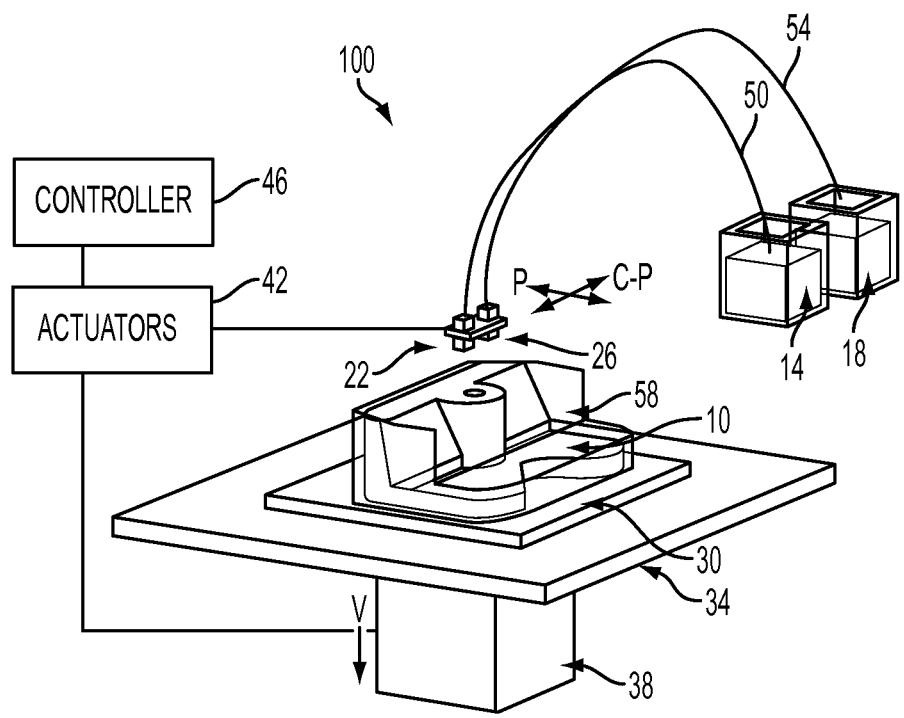
FIG. 1 is a perspective view of a three-dimensional object printer.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three-dimensional printer" refers to any device that ejects material with reference to image data of an object to form a three-dimensional object. The printer 100 includes a support material reservoir 14, a build material reservoir 18, a pair of inkjet printheads 22, 26, a build substrate 30, a planar support member 34, a columnar support member 38, an actuator 42, and a controller 46. Conduit 50 connects printhead 22 to support material reservoir 14 and conduit 54 connects printhead 26 to build material reservoir 18. Both inkjet printheads are operated by the controller 46 with reference to three-dimensional image data in a memory operatively connected to the controller to eject the support and build materials supplied to each respective printhead. The build material forms the structure of the part 10 being produced, while the support structure 58 formed by the support material enables the build material to maintain its shape while the material solidifies as the part is being constructed. After the part is finished, the support structure 58 is removed by washing, blowing, or melting.

The controller 46 is also operatively connected to at least one and possibly more actuators to control movement of the planar support member 34 and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to either the planar support member 34 or the columnar support member 38 to move the surface on which the part is being produced in the process and cross-process directions. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the planar support member 34 also move in a direction that is orthogonal to the planar support member 34. This direction is called the vertical direction in this document, is parallel to the columnar support member 38, and is denoted with the letter "V" in FIG. 1. Movement in the vertical direction can be effected by one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
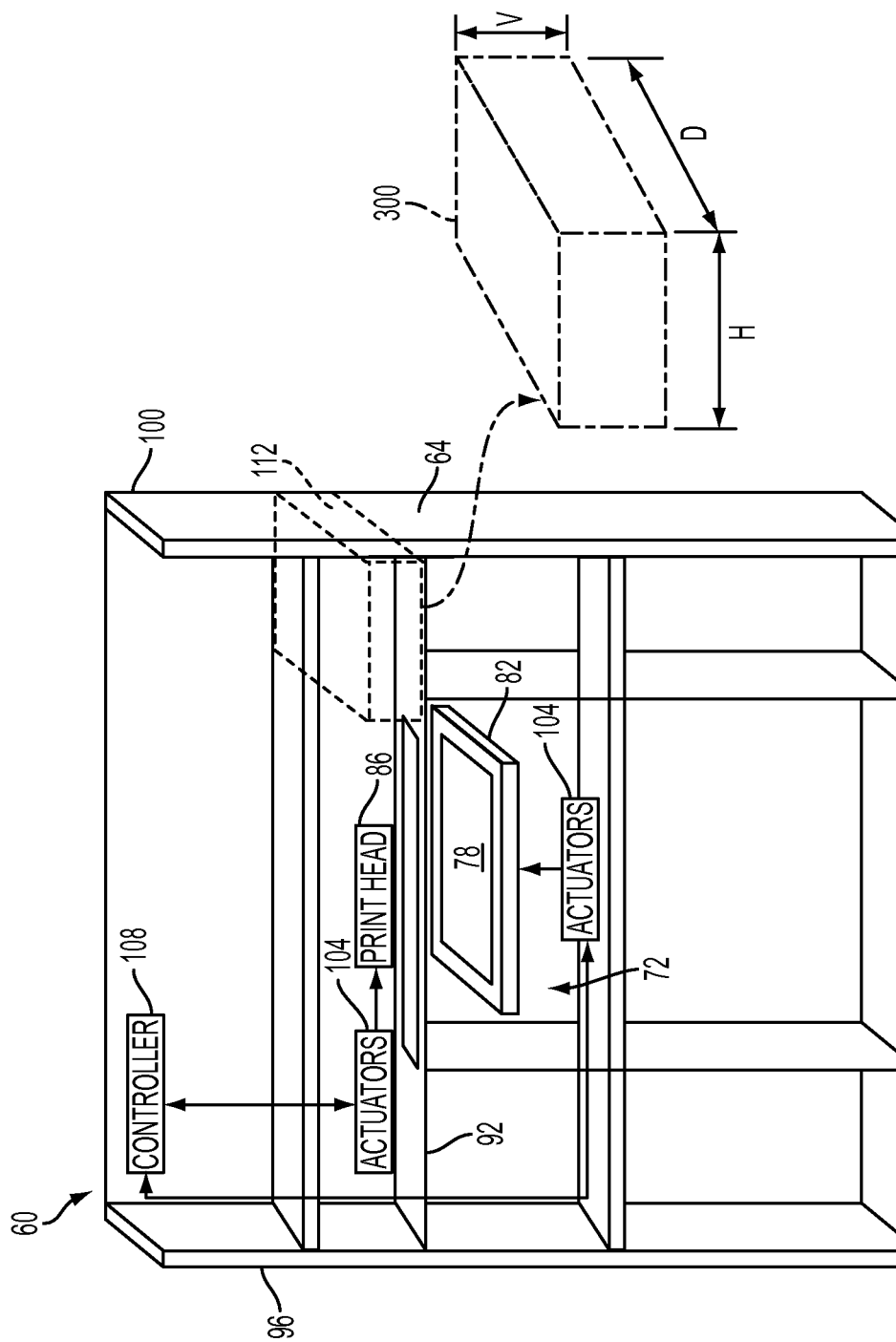
FIG. 2 is front view of a three-dimensional object printer having a housing that depicts a space within the housing for a module that enables inoperative inkjets in the printhead to be detected during a printing operation.

A three-dimensional object printer having a housing is shown in FIG. 2. That printer 60 has a housing 64. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three-dimensional object is formed. In some embodiments, the printhead 86 has a length that is approximately equal to the length of the planar support 78 in the direction from the back wall of compartment 72 to the opening at the front of the compartment. In these embodiments, printhead 86 is mounted on support member 92 in the space between sidewalls 96 and 100 of housing 64 for linear reciprocating movement only. In other embodiments, the printhead 86 has a length that is less than the length of the planar support 78 in the direction from the back wall of compartment 72 to the opening at the front of the compartment. In these embodiments, printhead 86 is mounted on support member 92 in the space between sidewalls 96 and 100 of housing 64 for reciprocating movement in two orthogonal directions in a plane above compartment 72. In these various embodiments, one or more actuators 104 are operatively connected to the printhead 86. Controller 108 operates the actuators 104 to move the printhead 86 either linearly back and forth on support member 92 or to move the printhead in two orthogonal directions within a plane. By selectively operating the inkjets in the printhead 86 and vertically moving the support platform 82 and horizontally moving the printhead 86 on the member 92, a three-dimensional object can be formed on the planar support 78.

The area 112 outlined in dashes in FIG. 2 identifies the placement of a module that uses a light transmitting substrate to detect inoperative inkjets in the printer 60. As noted above, if an inkjet fails during printing of an object by either completely or partially failing to eject material or by errantly ejected material in a skewed direction, the object being produced is malformed. Currently, this malformation cannot be detected until production of the object is finished. By using area 112 for optically sensing material ejected onto a light transmitting substrate, printer 60 can be configured to detect inoperative inkjets during object production as described more fully below. Some components within the module 300 can move in the horizontal direction H, depth direction D, and vertical direction V as shown in the figure.

Figure 3:
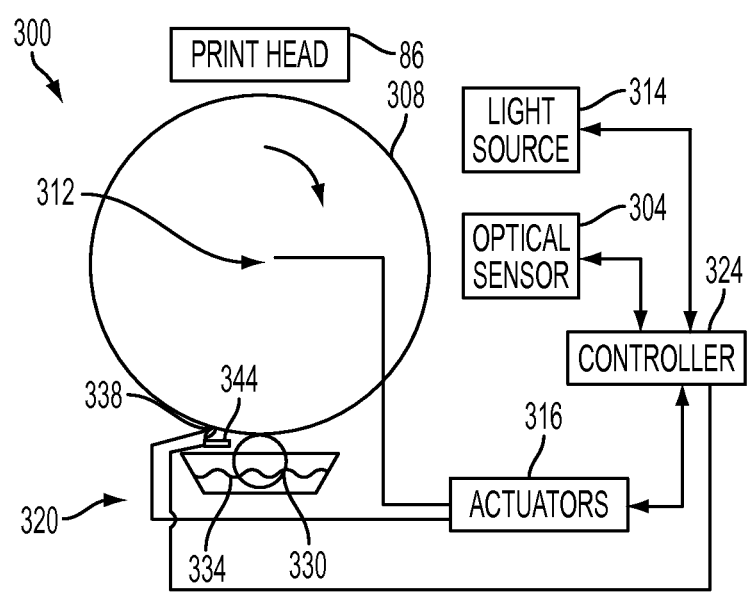
FIG. 3 is a side view of a module for detecting inoperative inkjets that fits in the space shown in FIG. 2.

One embodiment of a module that detects inoperative inkjets ejecting clear materials during object printing is shown in the block diagram of FIG. 3. The module 300 is configured to fit within area 112 of printer 60. The module 300 includes an optical sensor 304, a rotating drum 312 having a light transmitting surface layer 308, a light source 314, one or more actuators 316, a drum maintenance unit (DMU) 320, and a controller 324. Actuator 316 is operatively connected to the drum to rotate the drum 312. When the printhead is at the position shown in the figure, it can eject material from the printhead onto the surface layer of the drum 312. The drum 312 rotates in the direction of the arrow in the figure to a position opposite the optical sensor 304 while the light source 314 directs light into the edge of surface layer of the rotating drum 312. The optical sensor 304 is oriented to generate image data of the surface layer 308 of the drum 312, while light source 314 directs light into an edge of the surface layer 308 to enable light to propagate through the surface layer 308 in a direction perpendicular to the direction of drum movement, which would project out of the paper as shown in FIG. 3. The optical sensor 304 generates image data of the surface layer of the rotating drum 312, and, as explained below, the areas on the surface layer where the printhead has ejected material onto the surface layer 308 emit light. Thus, the image data of the drum surface layer can be compared to the image data used to operate the printhead 86 to eject the material onto the drum surface layer to detect inoperative inkjets.

The light source 314 can be an array of light emitting diodes (LEDs), an array of laser diodes, a cold cathode fluorescent lamp, a filament, or the like. The arrays can be one dimensional, that is, linear, or two dimensional arrays. The light produced by the light source 314 can be infrared, ultraviolet, polychromatic, or monochromatic. One advantage of infrared light is that is less susceptible to noise arising from ambient light conditions.

The drum continues to rotate to a position opposite the DMU 320. The DMU includes a donor roller 330 in a sump of release agent 334 and a metering blade 338 that is operatively connected to an actuator 316. The donor roller 330 applies the release agent in the sump 334 to the surface layer 308 and the metering blade 338 contacts the surface layer 308 to distribute the release agent in a layer covering the surface layer 308 while removing the ejected material and directing the excess agent and material into the sump 334. Additionally or alternatively, a heater 344 can be operatively connected to the controller 324 for selectively connecting the heater to a power supply. The heater is positioned with respect to the metering blade 338 to heat the build and support material before the cleaning member sweeps the surface layer 308 as described below. The controller 324 is operatively connected to the actuators 316, the optical sensor 304, and the light source 314 to rotate the drum and selectively operate the optical sensor 304, the light source 314, and the metering blade 338.

The light transmitting surface layer 308 of the drum 312 is made of a material that supports the build material and the support material ejected from the printhead 86 and that provides total internal reflection of light entering an edge of the surface layer. These materials enable light entering along an edge of the surface layer to remain within the surface layer unless some material on the surface of the layer on the rotating member has a refractive index that alters the total internal reflection property at the interface between the material and the surface of the layer on the rotating member. For printers that eject materials or ink having a refractive index in a range of about 1.3 to about 1.5, the light transmitting surface layer typically has a refractive index in a range of about 1.4 to about 1.8. For example, the surface layer 308 could consist essentially of polycarbonate, glass or acrylic. When the surface of the layer is printed, the similar index of refraction between the material ejected onto the planar surface of the layer and the surface layer enables light propagating down the surface layer to enter the material despite the shallow angle of incidence relative to the interface between the surface layer and the material. The light inside the material has a steep angle of incidence to the interface between the material and ambient air. This angle enables the light to exit into the ambient air. Other portions of the light experience multiple internal reflections before eventually exiting the material. The escaping light provides a visual indication of the position of the material on the surface of the light transmitting surface layer because the light escaping from the material deposits contrasts well with the uncovered surface of the layer where the light does not escape. The refractive index of the release agent is approximately 1.5 in the embodiment discussed above so it couples light from the surface layer 308 into the material on the surface of the layer 308 of the rotating member 312, but retains the light within the surface layer in the areas where the material is not present on the surface of the layer. When the surface layer 308 passes the optical sensor 304, the sensor 304 generates electrical signals that form image data of the test pattern on the surface of the layer 308.

The drum 312 can be formed in a variety of ways to provide the light transmitting surface layer 308. In some embodiments, the drum 312 can be molded from glass or a plastic, such as polycarbonate or acrylic in a manner that resembles a clear open cylinder. Alternatively, a metal drum, such as an anodized aluminum drum, can be coated with polycarbonate to form the surface layer 308 as a layer on the metal surface of the drum.

Figure 4:
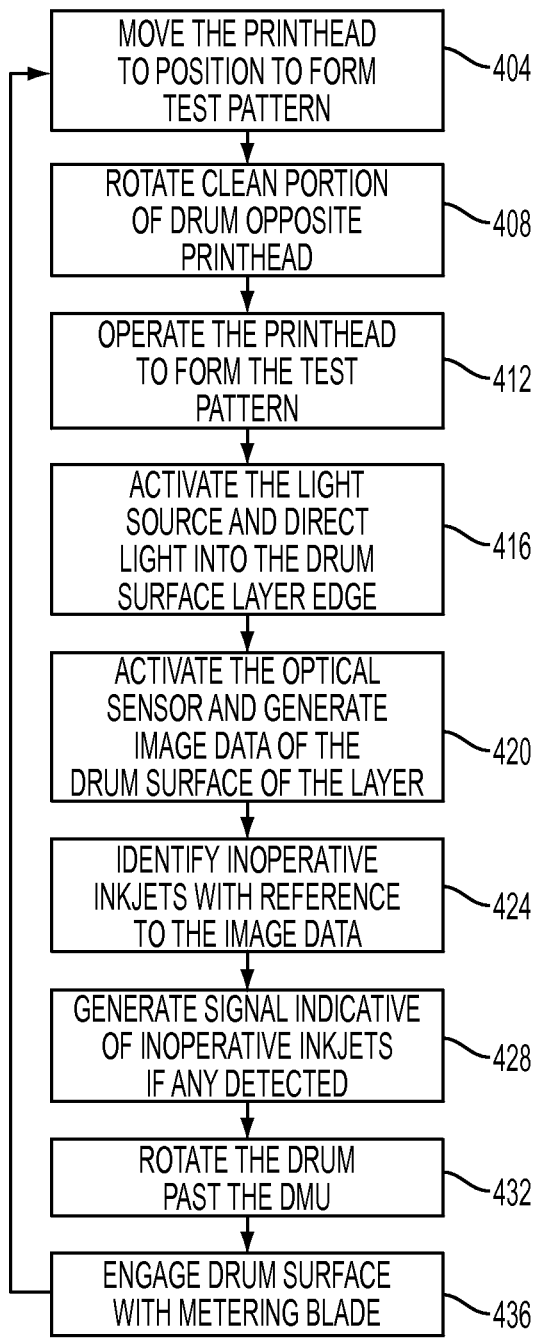
FIG. 4 is a flow diagram of a method for operating the module of FIG. 3.

A method of operating a printer that produces three-dimensional objects is shown in FIG. 4. In the description of this method, statements that a process is performing some task or function refers to a controller or general purpose processor executing programmed instructions stored in a memory operatively connected to the controller or processor to manipulate data or to operate one or more components in the printer to perform the task or function. The controller 324 noted above can be such a controller or processor. Alternatively, the controller 324 can be implemented with more than one processor and associated circuitry and components, each of which is configured to form one or more tasks or functions described herein.

At predetermined times in the printing operation, the controller 108 (FIG. 2) operates an actuator 104 to move the printhead 86 into the module 300 located in the area 112 (block 404). In response to the controller 324 detecting the printhead in the module 300, controller 324 operates the actuator 316 operatively connected to the drum 312 to rotate the drum and the light transmitting surface layer 308 so a clean portion of the surface of the layer is opposite the printhead 86 (block 408). Controller 324 then generates a signal to the controller 108 to operate the inkjets in the printhead to print a test pattern on the surface of the layer 308 (block 412). In one embodiment, each inkjet in the printhead is repetitively operated to deposit material, also called a test dot, on a portion of the surface of the layer 308 opposite the inkjet. After the test pattern is printed, controller 108 can move the printhead 86 out of the module 300. The controller 324 activates the light source 314 to shine light into one edge of the surface layer 308 as the drum 312 continues to rotate (block 416). Controller 324 activates the optical sensor 304 and the sensor generates electrical signals that are provided to the controller 324 as image data of the surface of the layer 308 (block 420). The areas where build material and support material have been ejected emit light as explained above. The portions of the surface layer that internally reflect light and those portions that emit light should correspond to the test pattern used to eject the build and support material. The image data of the surface of the layer 308 are analyzed with reference to expected positions for the build and support material used to form the test pattern to identify inoperative inkjets (block 424) and, if inoperative inkjets are identified, a signal indicative of the defective printhead is generated for the operator of the printer (block 428). The operator can then take appropriate action.

The process of FIG. 4 continues with the drum 312 continuing to rotate so the printed portion of the surface of the layer passes by the DMU 320 (block 432). Controller 324 operates an actuator 316 to engage the surface of the layer 308 with the donor roller 330 and the metering blade 334 to apply release agent to the surface of the layer and to remove material from the surface layer (block 436). The removed material is collected in the sump 334, which can be pumped through a filter (not shown) to remove the material so the release agent can be returned to the sump for later use. The operator can, from time to time, remove the DMU 320 and replace it with a new DMU to renew the drum cleaning function.

While the embodiments discussed above are within a printer that forms three-dimensional objects, a light transmitting surface layer and the system that detects inoperative inkjets from the light emitted by such a surface layer can also be used in two dimensional document printing systems, particularly those that use clear inks. In such systems, a light transmitting surface layer on a rotating drum can be positioned proximate a printing zone in the printer and, from time to time, the printhead is moved opposite the rotating surface layer for the ejection of ink onto the surface layer. Light is then directed into the surface layer and the surface is imaged so the image data can be analyzed to identify inoperative inkjets. Consequently, as used in this document, "material" when referring to a substance ejected from a printhead means build material and support material used in three-dimensional object printers and all types of inks used in two dimensional printing or the like.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer for forming objects comprising:
   a rotating member having a surface layer and an edge along a circumferential perimeter of the surface layer on the rotating member;
   a printhead configured to eject material onto the surface layer of the rotating member;
   a light source positioned to direct light into the edge at a position on the circumferential perimeter of the surface layer of the rotating member to enable the directed light to propagate through the surface layer of the rotating member;
   an optical sensor positioned to receive light emitted by the surface layer of the rotating member, the optical sensor being configured to generate image data corresponding to the surface layer of the rotating member; and
   a controller operatively connected to the printhead, the light source and the optical sensor, the controller being configured to operate the printhead to eject material onto the surface layer of the rotating member with reference to a predetermined pattern, to activate the light source selectively, to receive image data corresponding to the upper surface layer of the rotating member generated by the optical sensor while the light source is directing light into the edge at the position on the circumferential perimeter of the surface layer of the rotating member, and to detect inoperable inkjets in the printhead with reference to the received image data and the predetermined pattern.

2. The printer of claim 1 wherein the light source is an infrared light source.

3. The printer of claim 1 wherein the light source is an ultraviolet light source.

4. The printer of claim 1 wherein the light source is a monochromatic light source.

5. The printer of claim 1 wherein the light source is a polychromatic light source.

6. The printer of claim 1 wherein the light source is a laser diode.

7. The printer of claim 1, the optical sensor further comprising:
   a one dimensional array of photodetectors.

8. The printer of claim 1, the optical sensor further comprising:
   a two dimensional array of photodetectors.

9. The printer of claim 1 further comprising:
   a drum maintenance unit configured to apply release agent to the surface layer of the rotating member and to remove material from at least a portion of the surface layer of the rotating member; and
   the controller being operatively connected to the drum maintenance unit, the controller being further configured to operate the drum maintenance unit to remove material from the at least a portion of the surface of the surface layer.

10. The printer of claim 9, the drum maintenance unit further comprising:
    a member configured to engage the at least a portion of the surface layer of the rotating member and move with respect to the at least a portion of the surface layer of the rotating member; and
    an actuator operatively connected to the member and to the controller to enable the controller to operate the actuator to move the member with respect to the at least a portion of the surface layer of the rotating member.

11. The printer of claim 9, the drum maintenance unit further comprising:
    a heater positioned to heat the at least a portion of the surface layer of the rotating member; and
    the controller being further configured to operate the heater to heat the at least a portion of the surface layer of the rotating member to remove material from the at least a portion of the surface layer of the rotating member.

12. The printer of claim 1 wherein the surface layer of the rotating member is essentially comprised of polycarbonate.

13. The printer of claim 1 wherein the surface layer of the rotating member is essentially comprised of acrylic.

14. The printer of claim 1 wherein the surface layer of the rotating member is essentially comprised of glass.

15. The printer of claim 1 wherein the surface layer of the rotating member has a refractive index in a range of about 1.4 to about 1.8 and the material ejected by the printhead has a refractive index in a range of about 1.3 to about 1.5.

16. The printer of claim 1 wherein the rotating member is a rotating drum.

17. An apparatus for detecting inoperative inkjets in a printhead comprising:
    a rotating member having a surface layer and an edge along a circumferential perimeter of the surface layer on the rotating member;
    a light source positioned to direct light into the edge at a position on the circumferential perimeter of the surface layer of the rotating member to enable the directed light to propagate through the surface layer of the rotating member;
    an optical sensor positioned to receive light emitted by the surface layer of the rotating member, the optical sensor being configured to generate image data corresponding to the surface layer of the rotating member; and
    a controller operatively connected to the light source and the optical sensor, the controller being configured to activate the light source selectively, to receive image data corresponding to the surface layer of the rotating member generated by the optical sensor while the light source is directing light into the edge at the position on the circumferential perimeter of the surface layer of the rotating member, and to detect inoperable inkjets in a printhead that ejected material onto the surface layer of the rotating member with reference to the received image data and the predetermined pattern.

18. The apparatus of claim 17, the light source further comprising:
   a source of one of infrared light, ultraviolet light, monochromatic light, polychromatic light, and laser light.

19. The apparatus of claim 17 wherein the surface layer of the rotating member is essentially comprised of polycarbonate, glass, or acrylic.

20. The apparatus of claim 17 wherein the rotating member is a rotating drum.

* * * * *